(12) United States Patent
Tanaka (10) Patent No.: US 10,105,759 B2
(45) Date of Patent: Oct. 23, 2018

(54) METHOD AND APPARATUS FOR PRODUCING A ROD-LIKE BODY

(71) Applicant: HITACHI AUTOMOTIVE SYSTEMS, LTD., Ibaraki (JP)

(72) Inventor: Takayuki Tanaka, Ibaraki (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 0 days.

(21) Appl. No.: 15/561,416

(22) PCT Filed: Jul. 20, 2016

(86) PCT No.: PCT/JP2016/071219
§ 371 (c)(1),
(2) Date: Sep. 25, 2017

(87) PCT Pub. No.: WO2017/022481
PCT Pub. Date: Feb. 9, 2017

(65) Prior Publication Data
US 2018/0104748 A1    Apr. 19, 2018

(30) Foreign Application Priority Data

Jul. 31, 2015    (JP) ................................. 2015-152720

(51) Int. Cl.
*B23B 13/00*    (2006.01)
*B23B 5/08*    (2006.01)
(Continued)

(52) U.S. Cl.
CPC .................. *B23B 5/08* (2013.01); *B23P 9/00* (2013.01); *B23B 5/00* (2013.01); *B23Q 7/06* (2013.01); *B23Q 7/08* (2013.01); *B23Q 2707/003* (2013.01)

(58) Field of Classification Search
CPC ..... B23B 13/025; B23B 13/10; B23B 13/128; Y10T 82/2516; Y10T 82/2524; Y10T 82/2518; Y10T 82/2521
See application file for complete search history.

(56) References Cited

U.S. PATENT DOCUMENTS 2,746,613 A * 5/1956 Meyer ...................... B23Q 7/04
212/341
3,506,142 A * 4/1970 White .................... B65G 47/14
414/745.8
(Continued)

FOREIGN PATENT DOCUMENTS

JP    59-112503    7/1984
JP    61-260901    11/1986
(Continued)

OTHER PUBLICATIONS

International Search Report dated Aug. 16, 2016 in International Application No. PCT/JP2016/071219.

Primary Examiner — Will Fridie, Jr.
(74) Attorney, Agent, or Firm — Wenderoth, Lind & Ponack, L.L.P.

(57) ABSTRACT

The method includes a preprocessing transfer step which places an unprocessed rod-like body in a receiving position; a post-processing transfer step which pushes a processed rod-like body with the unprocessed rod-like body, and thus transfers the processed rod-like body to a rail portion; a rail portion transfer step which pushes the processed rod-like body with the unprocessed rod-like body, and thus transfers the processed rod-like body while being guided by the rail portion; a withdrawing step which withdraws the processed rod-like body from the rail portion using a withdrawing unit; a detection step which detects that the processed rod-like body is transferred from the rail portion to the withdrawing unit; and a discharge step which discharges the processed rod-like body from the withdrawing unit in a direction perpendicular to an axis of the processed rod-like body.

5 Claims, 7 Drawing Sheets

(51) Int. Cl.
  *B23P 9/00* (2006.01)
  *B23B 5/00* (2006.01)
  *B23Q 7/06* (2006.01)
  *B23Q 7/08* (2006.01)

(56) References Cited

U.S. PATENT DOCUMENTS

| | | | | |
|---|---|---|---|---|
| 3,587,822 A | * | 6/1971 | White | B23Q 7/06 198/463.5 |
| 3,630,069 A | * | 12/1971 | White | B23B 13/00 72/420 |
| 3,774,779 A | * | 11/1973 | White | B65G 47/14 414/746.2 |
| 4,324,162 A | * | 4/1982 | Uehara | B23B 3/161 82/125 |
| 5,505,584 A | * | 4/1996 | Berns | B23Q 7/00 406/109 |
| 6,189,424 B1 | * | 2/2001 | Wheeling | B23B 13/02 82/1.11 |
| 2005/0111957 A1 | | 5/2005 | Berns | |
| 2006/0053988 A1 | * | 3/2006 | Cucchi | B23B 13/123 82/124 |
| 2009/0064830 A1 | * | 3/2009 | Geiser | B23B 13/02 82/124 |
| 2009/0260492 A1 | * | 10/2009 | Maehara | B23Q 7/008 82/152 |

FOREIGN PATENT DOCUMENTS

| | | |
|---|---|---|
| JP | 5-185302 | 7/1993 |
| JP | 2007-61959 | 3/2007 |

* cited by examiner

METHOD AND APPARATUS FOR PRODUCING A ROD-LIKE BODY

TECHNICAL FIELD

The invention relates to a method and apparatus for producing a rod-like body.

BACKGROUND ART

Some apparatuses use a chute to discharge pipes that have been cut off (for example, see Patent Literature 1).

RELATED ART DOCUMENT

Patent Literature

PTL 1: Japanese Unexamined Patent Application Publication (Kokai) No. S61-260901

SUMMARY OF INVENTION

Technical Problem

Rod-like bodies, after being processed by a processing unit, are desired to be favorably discharged with a limited cost increase.

It is an object of the invention to provide a method and apparatus for producing a rod-like body, which enable a processed rod-like body to be favorably discharged with a limited cost increase.

Solution to Problem

To accomplish the object, the method for producing a rod-like body according to the invention comprises a preprocessing transfer step (or an ante-processing transfer step) which transfers an unprocessed rod-like body relative to a processing unit in one direction along an axis of the unprocessed rod-like body and places the unprocessed rod-like body in a receiving position in the processing unit; a processing step which processes the unprocessed rod-like body into a processed rod-like body by using the processing unit; a post-processing transfer step which pushes a processed rod-like body with the unprocessed rod-like body by the preprocessing transfer step for an unprocessed rod-like body and thus transfers the processed rod-like body in one direction along an axis of the processed rod-like body to a rail portion which is provided integrally with the processing unit; a rail portion transfer step which pushes a processed rod-like body with the unprocessed rod-like body by the preprocessing transfer step for an unprocessed rod-like body, and thus transfers the processed rod-like body in one direction along an axis of the processed rod-like body while being guided by the rail portion; a withdrawing step which withdraws a processed rod-like body from the rail portion along an axis of the processed rod-like body by using a withdrawing unit which is provided integrally with the rail portion to be located on an opposite side to the processing unit; a detection step which detects that a processed rod-like body is transferred from the rail portion to the withdrawing unit; and a discharge step which discharges a processed rod-like body, which is detected in the detection step to have been transferred from the rail portion to the withdrawing unit, from the withdrawing unit in a direction perpendicular to an axis of the processed rod-like body.

An apparatus for producing a rod-like body according to the invention comprises a processing unit configured to process a rod-like body; a rail portion configured to guide a plurality of rod-like bodies transferred in an axial direction by being pushed by a rod-like body discharged from the processing unit; a withdrawing unit provided to the rail portion to be located on an opposite side to the processing unit and configured to withdraw the rod-like body from the rail portion; and a discharge unit configured to discharge the rod-like body from the withdrawing unit in a direction perpendicular to an axis of the rod-like body.

Advantageous Effects of Invention

The invention makes it possible to favorably discharge a processed rod-like body with a limited cost increase.

DESCRIPTION OF EMBODIMENTS

One embodiment of the invention will be explained below with reference to the drawings.

Figure 1:
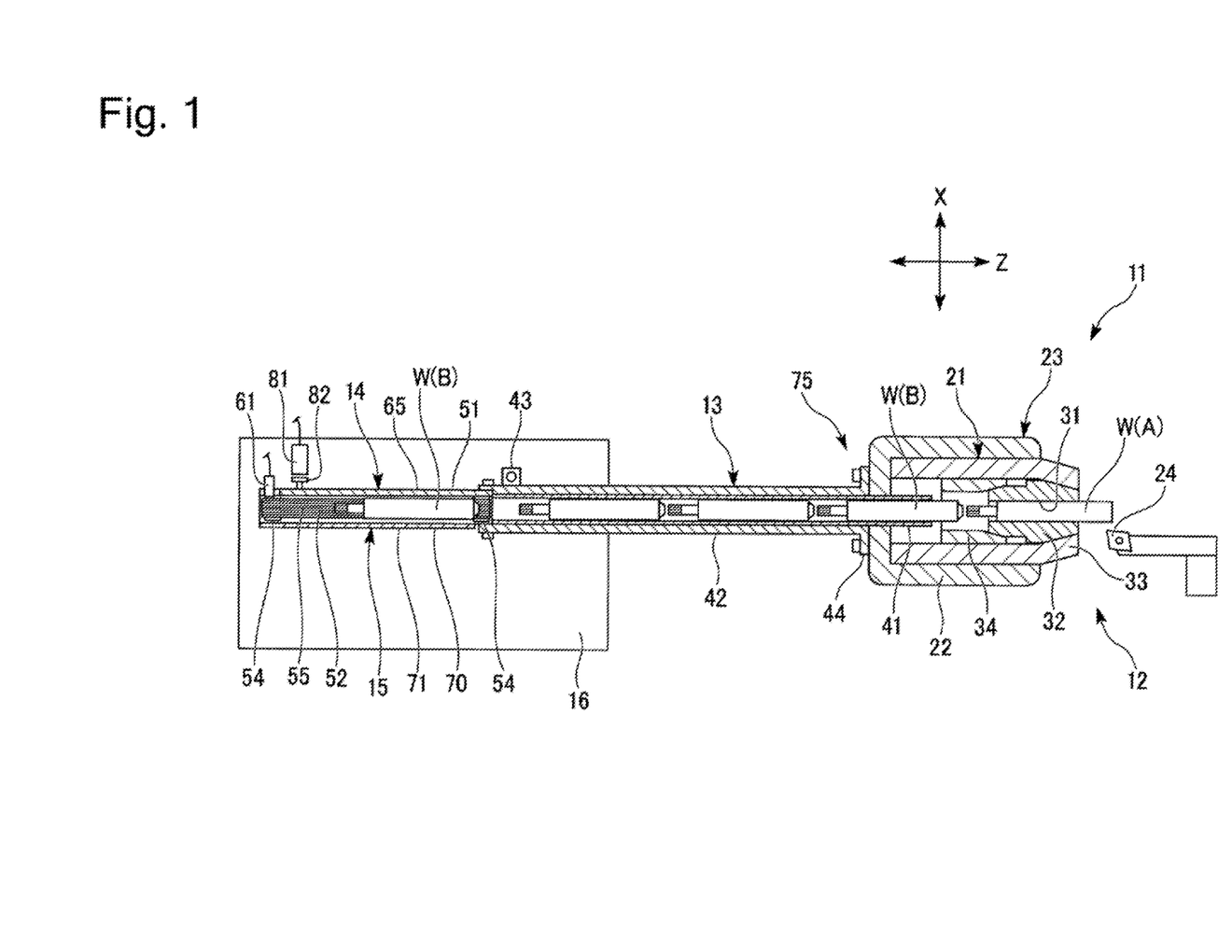
FIG. 1 is a sectional plan view showing an apparatus for producing a rod-like body according to one embodiment of the invention.

A production apparatus 11 of the present embodiment shown in FIG. 1 includes a processing unit 12, a rail portion 13, a withdrawing unit 14, a discharge unit 15, and a guide chute 16.

The processing unit 12 is configured to process a rod-like body (or a rod-shaped body) W, such as a solid rod and a hollow cylinder. The processing unit 12 applies predetermined processing to the rod-like body W which has gone through a preceding process. The processing unit 12, more specifically, is an NC lathe which applies lathe turning processing to the rod-like body W. The rod-like body W has a largest diameter portion, an outer peripheral surface of which is a cylinder surface. In other words, the rod-like body W has a shape that allows it to easily move by rolling in a direction perpendicular to an axis thereof.

The processing unit 12 includes a processing unit main body 23 provided with a rotary head 21 which rotates while gripping the rod-like body W and a casing 22 which rotatably supports the rotary head 21, and a machining tool 24 configured to machine the rod-like body W rotating while being gripped by the processing unit main body 23.

Figure 2:
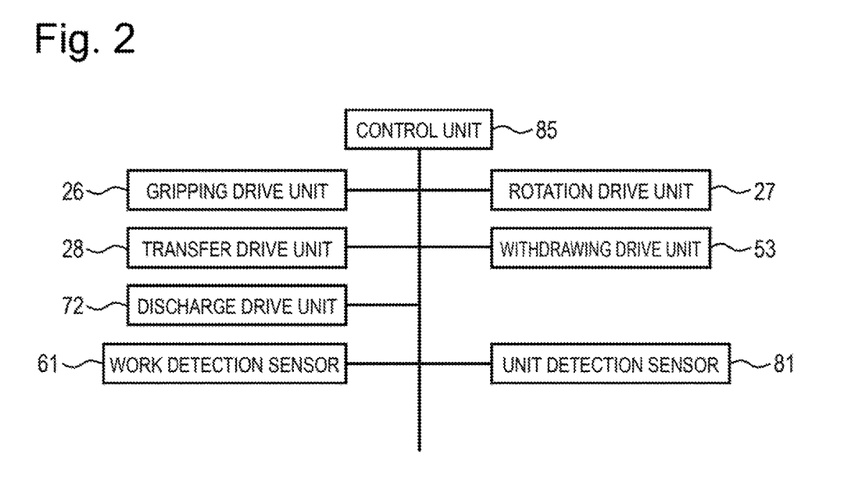
FIG. 2 is a block diagram of a control system which is a main part of the apparatus for producing a rod-like body according to one embodiment of the invention.

The rotary head 21 is driven by a gripping drive unit 26 shown in FIG. 2 to grip the rod-like body W so that a central axis of the rod-like body W is aligned with a rotation central axis of the rotary head 21. The rotary head 21 is driven by a rotation drive unit 27 shown in FIG. 2 to rotate within the casing 22, to thereby make the gripped rod-like body W rotate around the central axis of the rod-like body W. The casing 22 is movable in a direction of the rotation central axis of the rotary head 21 (Z-direction in FIG. 1) and in a horizontal direction perpendicular to the rotation central axis (X-direction in FIG. 1) while supporting the rotary head 21. The casing 22 is horizontally moved by being driven by a transfer drive unit 28 shown in FIG. 2 to move horizontally. In short, the processing unit main body 23 horizontally moves in the directions mentioned above. The processing unit main body 23 does not move vertically. The machining tool 24 is fixed in position.

The rotary head 21 of the processing unit main body 23 rotates while gripping the rod-like body W. In the foregoing state, the processing unit main body 23 is transferred relative to the machining tool 24 along a preset locus. The machining tool 24 then comes into contact with and move relative to a protruding portion of the rotating rod-like body W, which protrudes from the rotary head 21. The machining tool 24 thus machines the protruding portion of the rotating rod-like body W.

The rotary head 21 includes a chuck main body 32 having a cylindrical shape due to a through-hole 31 formed therethrough, a cap nut 33 which is a cylindrical outer cylinder covering an outer peripheral side of the chuck main body 32, and a cylindrical sleeve 34 disposed on an inner peripheral side of the cap nut 33. The embodiment of invention will be explained on the premise that an axial side of the processing unit main body 23 where the machining tool 24 is located is referred to as a front side, and an opposite side of the processing unit main body 23 to the machining tool 24 is referred to as a rear side.

Although not shown, the chuck main body 32 has a plurality of slots (or slits) circumferentially arranged at regular intervals. The slots allow the chuck main body 32 to expand and contract. The chuck main body 32 has tapered faces in front-side and rear-side outer peripheral surfaces. The cap nut 33 has a tapered surface formed in a front-side inner peripheral portion. The tapered surface of the cap nut 33 contacts the front-side tapered surface of the chuck main body 32. The sleeve 34 has a tapered surface formed in a front-side inner peripheral portion. The tapered surface of the sleeve 34 contacts the rear-side tapered surface of the chuck main body 32.

The sleeve 34 is axially reciprocatable relative to the cap nut 33 when driven by the gripping drive unit 26. After moving to the front side, the sleeve 34 presses the chuck main body 32 toward the front side to push the chuck main body 32 against the cap nut 33. The chuck main body 32 is thus reduced in diameter to grip the rod-like body W which is inserted in the through-hole 31 of the chuck main body 32. When the sleeve 34 moves to the rear side, releasing pressure on the chuck main body 32, the chuck main body 32 is increased in diameter due to springback and releases the grip on the rod-like body W inserted in the through-hole 31 of the chuck main body 32.

Figure 3:
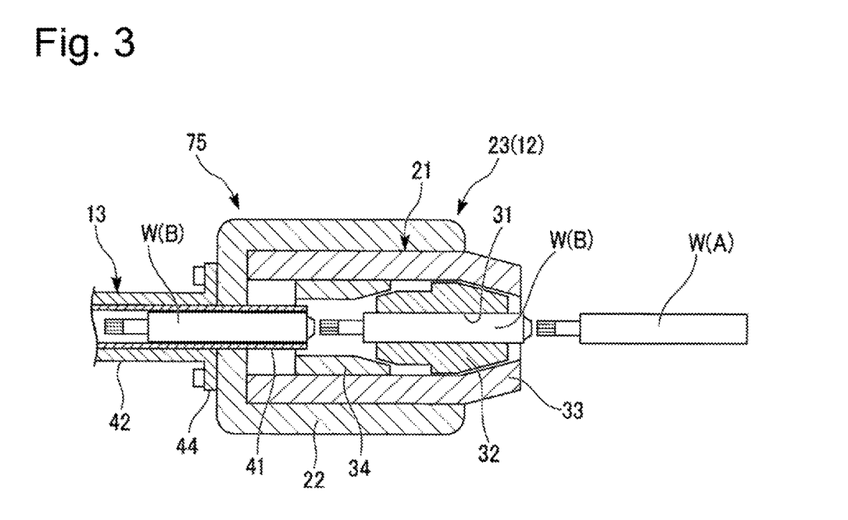
FIG. 3 is a sectional plan view showing a processing unit and a rail portion of the apparatus for producing a rod-like body according to one embodiment of the invention to explain a preprocessing transfer step and a post-processing transfer step.

Hereinafter, the rod-like body W that has not yet been processed by the processing unit 12 is referred to as an unprocessed rod-like body W(A), and the rod-like body W that has been processed is referred to as a processed rod-like body W(B). As shown in FIG. 3, the processing unit main body 23 of the processing unit 12 is fed with the unprocessed rod-like body W(A) from the front side, and the processed rod-like body W(B) that has been processed is discharged from the processing unit main body 23 to the rear side. During the above process, the unprocessed rod-like body W(A) and the processed rod-like body W(B) move in the axial direction.

For example, the unprocessed rod-like body W(A) which has gone through the preceding process is moved by a feeding unit, not shown, to the rear side along the axis of the unprocessed rod-like body W(A) and inserted into the through-hole 31 of the chuck main body 32 from the front side. If there is the processed rod-like body W(B) in the chuck main body 32, which is free from the grip of the chuck main body 32, the processed rod-like body W(B) is pushed by the unprocessed rod-like body W(A) that has been inserted. The processed rod-like body W(B) then moves to the rear side along the axis thereof and is pushed out of the chuck main body 32 to the rear side.

Alternatively, the processing unit main body 23 moves horizontally to collect the unprocessed rod-like body W(A) which has gone through the preceding process. To be more specific, the processing unit main body 23 moves to the front side along the axis of the unprocessed rod-like body W(A), and the through-hole 31 of the chuck main body 32 receives the unprocessed rod-like body W(A) from the front side. If there is the processed rod-like body W(B) in the chuck main body 32, which is free from the grip of the chuck main body 32, the processed rod-like body W(B) is pushed by the unprocessed rod-like body W(A) that has been received. The processed rod-like body W(B) then moves to the rear side along the axis thereof and is pushed out of the chuck main body 32 to the rear side.

In other words, the unprocessed rod-like body W(A) is transferred relative to the processing unit main body 23 of the processing unit 12 in one direction (toward the rear side) along the axis of the unprocessed rod-like body W(A) to be fed to the processing unit main body 23. The processing unit main body 23 processes the unprocessed rod-like body W(A) that has been fed, into the processed rod-like body W(B). At the same time, the processed rod-like body W(B) that has been processed is pushed by the unprocessed rod-like body W(A) which is being fed, and moves in one direction (toward the rear side) along the axis of the processed rod-like body W(B).

Figure 4:
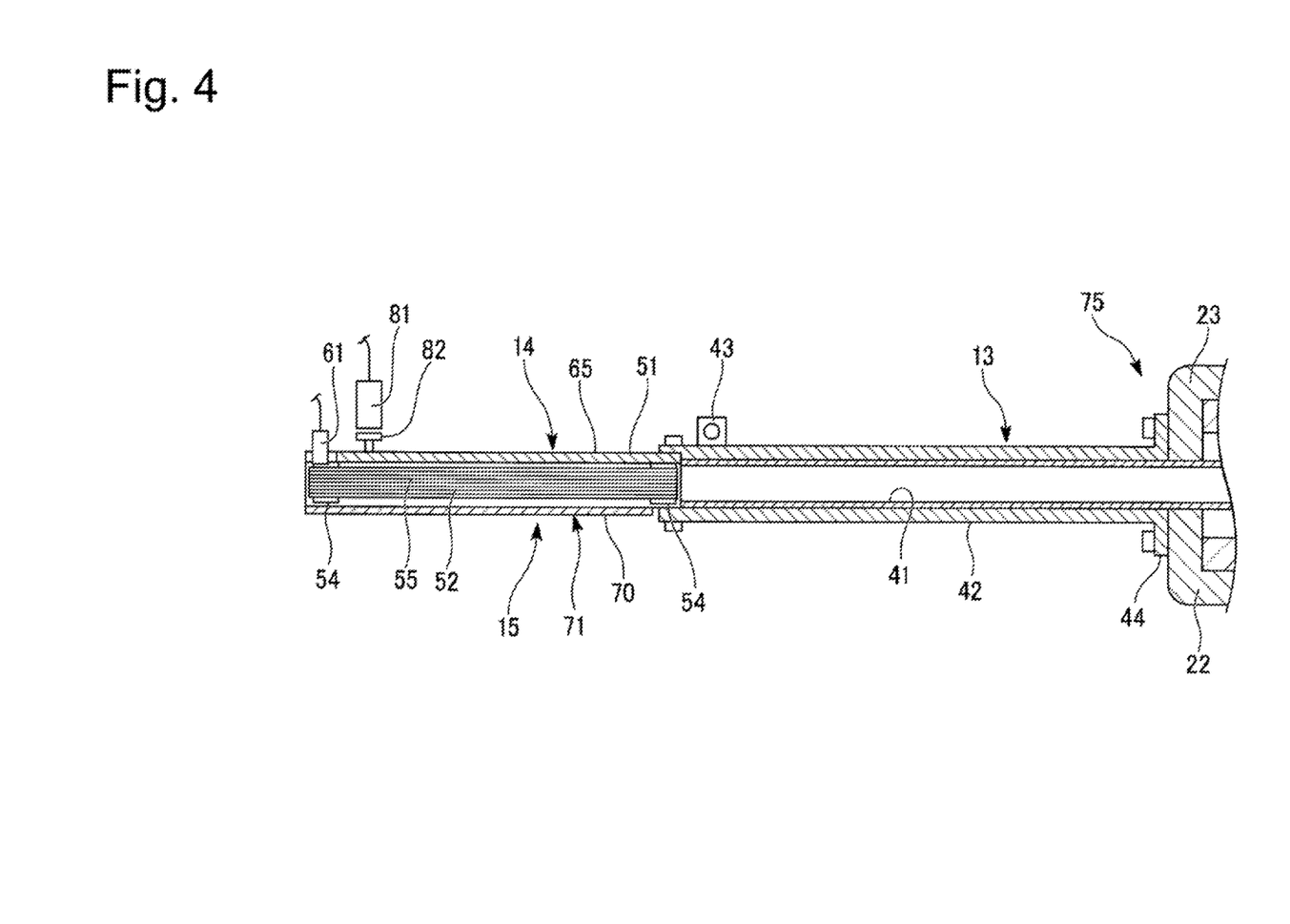
FIG. 4 is a sectional plan view showing the rail portion, a withdrawing unit, and a discharge unit of the apparatus for producing a rod-like body according to one embodiment of the invention.
Figure 5:
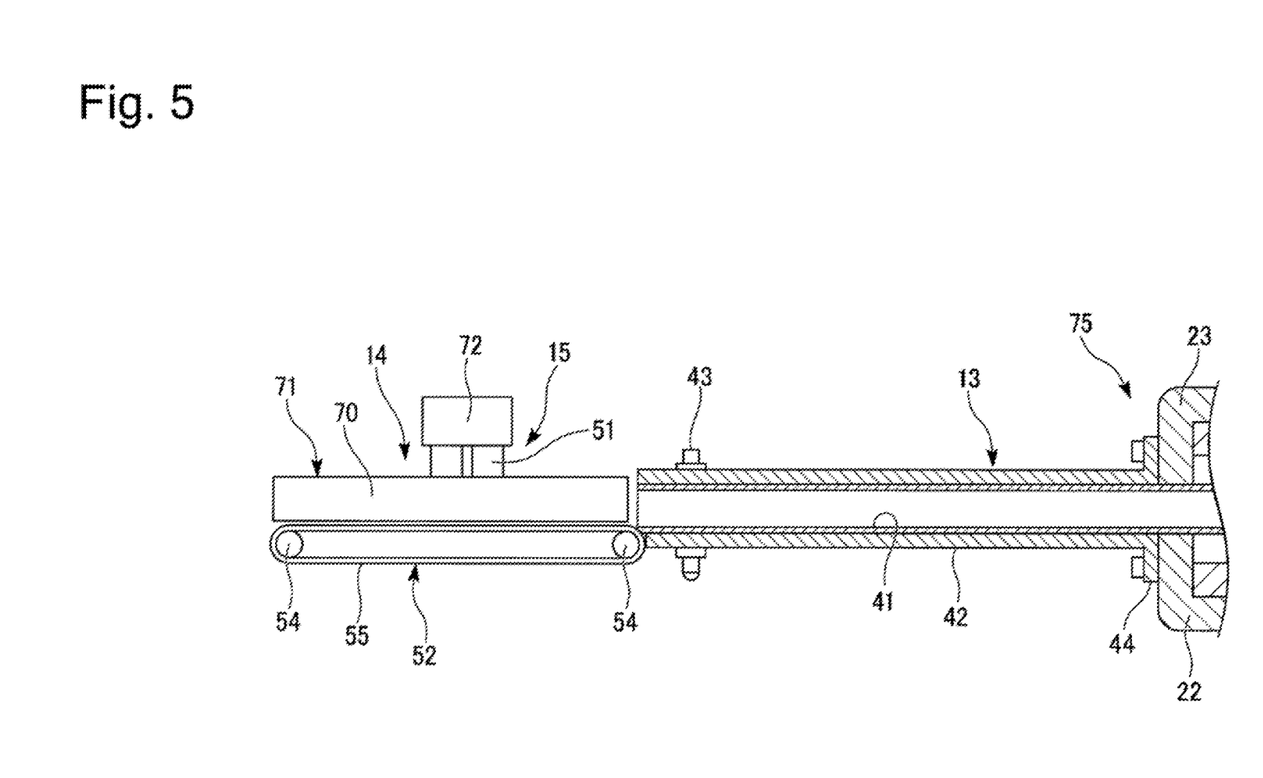
FIG. 5 is an elevation view, a part of which is a cross-section, showing the rail portion, the withdrawing unit, and the discharge unit of the apparatus for producing a rod-like body according to one embodiment of the invention.

The rail portion 13 is fixed to a rear side of the processing unit main body 23 of the processing unit 12 in a horizontal position. As shown in FIGS. 4 and 5, the rail portion 13 includes a rail main body 41 formed of a cylindrical pipe, and a cylindrical attachment member 42 that is fixed to the rail main body 41 so as to cover an outer periphery of the rail main body 41. The rail portion 13 is provided with a shock absorber 43 that prevents or reduces vibrations of the rail portion 13. A flange 44 is located on one axial end side of the attachment member 42 and fixed to the casing 22 with the rail main body 41 of the rail portion 13 inserted in a rear side of the casing 22 of the processing unit main body 23. In the foregoing state, the rail main body 41 horizontally extends on an extended line of the through-hole 31 of the chuck main body 32 of the processing unit main body 23 as shown in FIG. 1. The shock absorber 43 includes a ball plunger and a spring. The shock absorber 43 prevents or reduces vibrations generated when the rail portion 13 moves integrally with the processing unit main body 23.

As shown in FIGS. 3 to 1, the processed rod-like body W(B) which has been pushed out of the chuck main body 32 by the insertion of the unprocessed rod-like body W(A) enters the inside of the rail main body 41 of the rail portion 13. The processed rod-like body W(B) thus pushed out of the chuck main body 32 is guided by the rail portion 13 to an opposite side to the processing unit 12 along the axis of the processed rod-like body W(B). Phrased in another way, every time the unprocessed rod-like body W(A) is inserted into the chuck main body 32, the processed rod-like body W(B) moves along the axis thereof within the rail portion 13 in a direction away from the processing unit main body 23 by distance equal to length of each processed rod-like body W(B). The rail portion 13 is provided integrally with the processing unit main body 23 of the processing unit 12. The processed rod-like body W(B) which is being pushed and moved by the unprocessed rod-like body W(A) which is being fed to the processing unit 12 is guided by the rail portion 13 in one direction (toward the opposite side to the processing unit 12) along the axis of the processed rod-like body W(B). The rail main body 41 has a length equal to total length of more than one processed rod-like body W(B).

The withdrawing unit 14 is provided integrally with the rail portion 13 to be located on an opposite side to the processing unit main body 23 as shown in FIG. 4. The withdrawing unit 14 includes a frame 51 which is fixed to the opposite side of the rail portion 13 to the processing unit 23 so as to extend on an extended line of the rail portion 13, a belt conveyer 52 which is supported by the frame 51 so that a longitudinal direction of the belt conveyer 52 horizontally extends on the extended line of the rail portion 13, and a withdrawing drive unit 53 shown in 2, which is configured to drive the belt conveyer 52.

Figure 6:
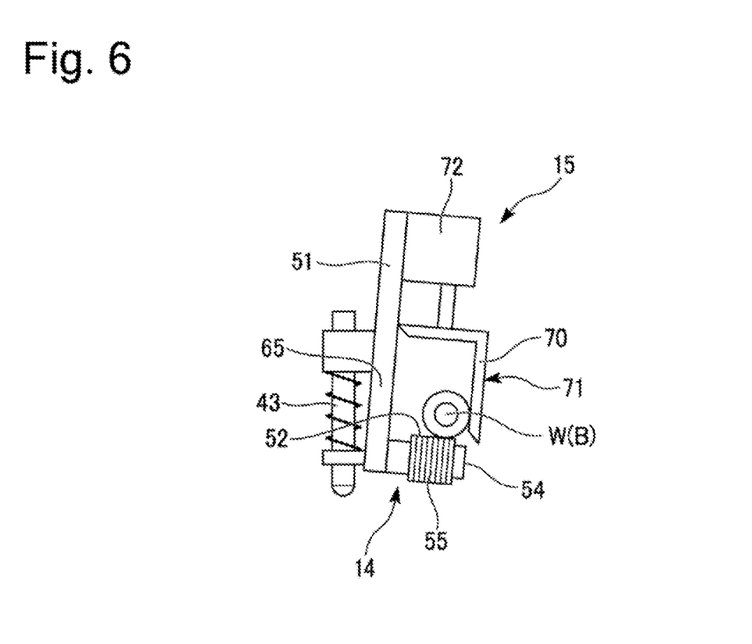
FIG. 6 is a side view showing the withdrawing unit and the discharge unit of the apparatus for producing a rod-like body according to one embodiment of the invention.

The belt conveyer 52 has a roller 54 which is rotatably mounted on a lower part of the frame 51 as shown in FIG. 6. The roller 54 comprises two rollers 54 in a pair. One of the pair of rollers 54 is located in an end portion of the frame 51, which is close to the rail portion 13, and the other is located on an end portion opposite to the rail portion 13, as shown in FIG. 4. The rollers 54 are positioned at the same level as each other, as shown in FIG. 5. The belt conveyer 52 includes an endless belt 55 which is looped over the rollers 54. In the foregoing state, the endless belt 55 horizontally extends on the extended line of the rail portion 13. The rollers 54 of the belt conveyer 52 are rotated by the withdrawing drive unit 53 shown in FIG. 2, which rotates the endless belt 55. During the rotation, an upper face of the endless belt 55 horizontally moves in a direction away from the rail portion 13.

Figure 7:
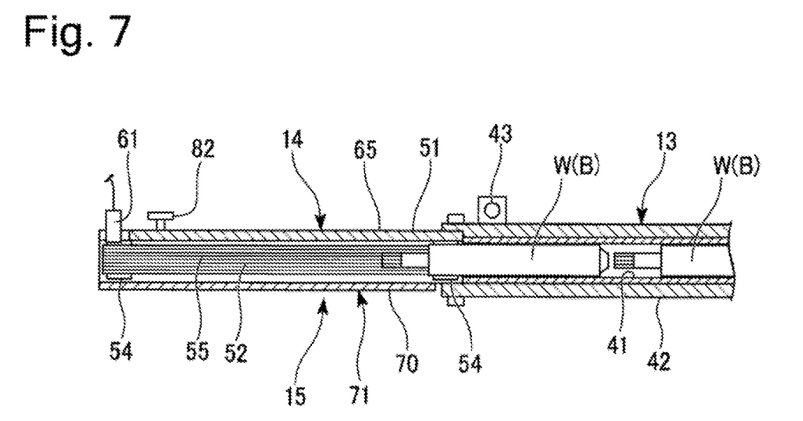
FIG. 7 is a sectional plan view showing the rail portion, the withdrawing unit, and the discharge unit of the apparatus for producing a rod-like body according to one embodiment of the invention to explain a rail portion transfer step.
Figure 8:
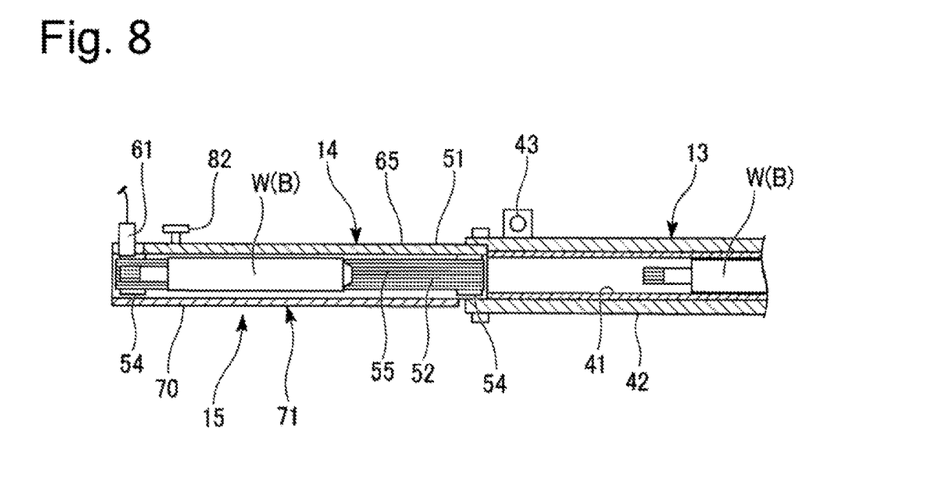
FIG. 8 is a sectional plan view showing the rail portion, the withdrawing unit, and the discharge unit of the apparatus for producing a rod-like body according to one embodiment of the invention to explain a withdrawing step.

As shown in FIG. 5, the upper face of the endless belt 55 of the belt conveyer 52 is positioned at the same level as a lower end of an inner peripheral surface of the rail main body 41. The processed rod-like body W(B) which is partially pushed out of the rail portion 13, as shown in FIG. 7, is brought into contact with the upper face of the endless belt 55. When the belt conveyer 52 is driven by the withdrawing drive unit 53 shown in FIG. 2, the belt conveyer 52 withdraws the processed rod-like body W(B) which has come into contact as described above, from the rail portion 13 along the axis of the processed rod-like body W(B) as shown in FIGS. 7 and 8. After withdrawing the processed rod-like body W(B), the belt conveyer 52 further carries the processed rod-like body W(B) in a withdrawing direction with the processed rod-like body W(B) placed on the belt conveyer 52.

The production apparatus 11 has a work detection sensor 61 (detection sensor), such as a proximity switch, which is disposed in the withdrawing unit 14 and detects that the whole processed rod-like body W(B) is transferred from the rail portion 13 to the withdrawing unit 14. The work detection sensor 61 is fixed to the frame 51 of the withdrawing unit 14. After the processed rod-like body W(B) is withdrawn from the rail portion 13 to the withdrawing unit 14, when an opposite end of the processed rod-like body W(B) to the rail portion 13 coincides with an opposite end of the belt conveyer 52 to the rail portion 13 as shown in FIG. 8, the work detection sensor 6 detects the end of the processed rod-like body W(B).

When the processed rod-like body W(B) is detected by the work detection sensor 61, the belt conveyer 52 is suspended to restrict axial projection of the processed rod-like body W(B) from the withdrawing unit 14. The endless belt 55 of the belt conveyer 52 is made of material with a high friction coefficient, such as synthetic rubber. Regardless of inertia generated by suspension of the belt conveyer 52, inertia generated by movement of the whole withdrawing unit 14, and such, the endless belt 55 stops the axial movement of the processed rod-like body W(B).

As shown in FIG. 6, the frame 51 has a restriction wall 65 which vertically extends on one width-direction side of the endless belt 55 of the belt conveyer 52. The restriction wall 65 restricts the processed rod-like body W(B) from being dropped from the endless belt 55 to the one width-direction side. The belt conveyer 52 is inclined in a width direction thereof with respect to a horizontal line so that a side of the belt conveyer 52, which is close to the restriction wall 65, is high, and a side far from the restriction wall 65 is low. The processed rod-like body W(B) on the endless belt 55 of the belt conveyer 52 therefore rolls under its own weight in an opposite direction to the restriction wall 65. Otherwise phrased, the processed rod-like body W(B) moves in a direction perpendicular to the axis thereof due to its own weight.

Figure 9:
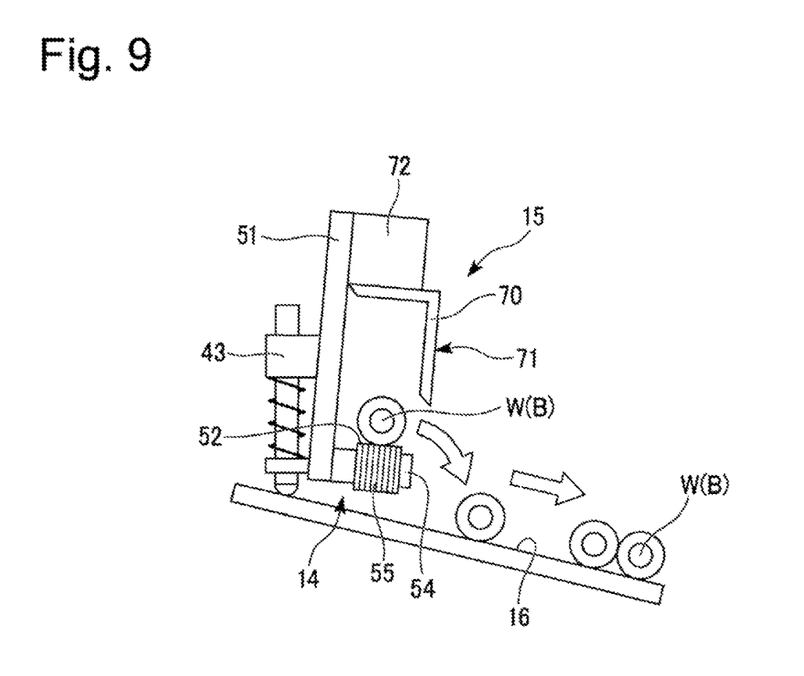
FIG. 9 is a side view showing the withdrawing unit and the discharge unit of the apparatus for producing a rod-like body according to one embodiment of the invention to explain a discharge step.

The discharge unit 15 includes a discharge switching member 71 with a latching plate 70 disposed parallel to the restriction wall 65 on an opposite side of the belt conveyer 52 to the restriction wall 65 as viewed in the width direction of the belt conveyer 52. The discharge unit 15 further includes a discharge drive unit 72 that is fixed to the frame 51 and configured to lift and lower the discharge switching member 71 vertically relative to the belt conveyer 52. When the discharge switching member 71 is brought into a lowered state by the discharge drive unit 72 as shown in FIG. 6, the discharge switching member 71 is in a restriction state where the latching plate 70 restricts the rolling of the processed rod-like body W(B), which is caused by inclination of the belt conveyer 52 of the withdrawing unit 14. When the discharge switching member 71 is brought into a lifted state by the discharge drive unit 72 as shown in FIG. 9, the discharge switching member 71 is in an allowing state where the processed rod-like body W(B) is allowed to roll due to the inclination of the belt conveyer 52. In brief, the discharge unit 15 is switched between the restriction state and the allowing state which respectively restricts and allows the rolling of the processed rod-like body W(B), which is caused by the inclination of the belt conveyer 52.

When the discharge unit 15 is in the restriction state, the processed rod-like body W(B) which comes to the latching plate 70 side due to the inclination of the belt conveyer 52 is axially transferred by the belt conveyer 52 while being guided by the latching plate 70. When the discharge unit 15 is in the allowing state, a gap is created between the belt conveyer 52 and the discharge unit 15. This makes the processed rod-like body W(B) roll on the belt conveyer 52 due to the inclination of the belt conveyer 52 in the direction perpendicular to the axis to be dropped from the belt conveyer 52. When the discharge unit 15 comes into the allowing state which allows the rolling of the processed rod-like body W(B), the discharge unit 15 discharges the processed rod-like body W(B) from the withdrawing unit 14 in the direction perpendicular to the axis.

The discharge unit 15 is normally in the restriction state with the discharge switching member 71 lowered as shown in FIG. 6. When the processed rod-like body W(B) is detected by the work detection sensor 61 as shown in FIG. 8, the discharge switching member 71 is lifted by the discharge drive unit 72 to bring the discharge unit 15 into the allowing state as shown in FIG. 9. The discharge unit 15 then discharges the processed rod-like body W(B) from the withdrawing unit 14 in the direction perpendicular to the axis.

As shown in FIG. 1, the production apparatus 11 forms a movable unit 75 in which the processing unit main body 23, the rail portion 13, the withdrawing unit 14, and the discharge unit 15 move in an integral manner.

The guide chute 16 is disposed under the belt conveyer 52 of the movable unit 75. The guide chute 16 is disposed parallel to the central axis of the processed rod-like body W(B) placed on the belt conveyer 52. The guide chute 16 is inclined relative to the horizontal line so that the processed rod-like body W(B) is at a lower level as the processed rod-like body W(B) comes closer to one side of the guide chute 16 as viewed in the horizontal direction perpendicular to the central axis of the processed rod-like body W(B) placed on the belt conveyer 52. The movable unit 75 moves in a direction along the central axis of the processed rod-like body W(B) located in the movable unit 75 (Z-direction) and a horizontal direction perpendicular to the central axis of the above-mentioned processed rod-like body W(B) (X-direction) at least during the processing of the unprocessed rod-like body W(A) by the processing unit 12.

Figure 10:
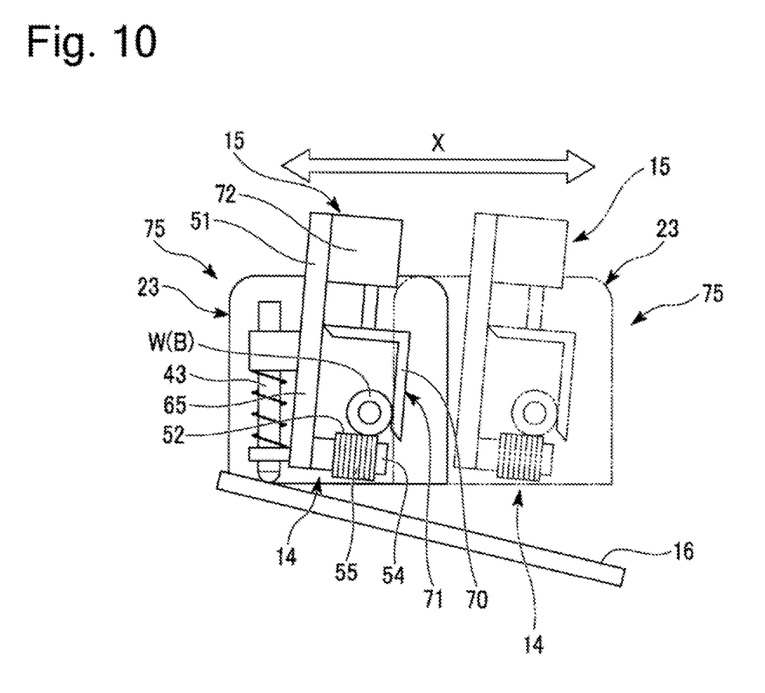
FIG. 10 is a side view showing the withdrawing unit and the discharge unit of the apparatus for producing a rod-like body according to one embodiment of the invention.

When the movable unit 75 is located in the furthest edge on one side in the horizontal direction perpendicular to the central axis of the processed rod-like body W(B) disposed in the movable unit 75, the belt conveyer 52 is located closest to the guide chute 16 in a height direction as shown by solid lines in FIG. 10. From the above-described state, if the movable unit 75 moves to the other side in the horizontal direction perpendicular to the central axis of the processed rod-like body W(B) disposed in the movable unit 75, the belt conveyer 52 moves away from the guide chute 16 in the height direction as shown by two-dot chain lines in FIG. 10.

As shown in FIG. 1, the production apparatus 11 includes a unit detection sensor 81, such as a proximity switch, which is fixed in position. The unit detection sensor 81 detects that the movable unit 75 including the processing unit main body 23, the rail portion 13, the withdrawing unit 14, and the discharge unit 15 of the processing unit 12 is placed in a predetermined position. The predetermined position at which the movable unit 75 is detected by the unit detection sensor 81 is a discharge position at which the movable unit 75 makes the belt conveyer 52 closest to the guide chute 16 in the height direction, and causes the whole processed rod-like body W(B) on the belt conveyer 52, which is detected by the work detection sensor 61, to be horizontally superposed on the guide chute 16.

A detection piece 82 is fixed to the frame 51 of the withdrawing unit 14 of the movable unit 75. The detection piece 82 is projecting in an opposite direction to the belt conveyer 52. The unit detection sensor 81 approaches and detects the detection piece 82, and thus detects that the movable unit 75 is in the discharge position. When the unit detection sensor 81 detects the movable unit 75, that is, when the movable unit 75 is in the discharge position, the discharge unit 15 discharges the processed rod-like body W(B) from the withdrawing unit 14 as shown in FIG. 9. The processed rod-like body W(B) which rolls in the direction perpendicular to the axis to be discharged from the withdrawing unit 14 at the discharge position is dropped onto the guide chute 16 parallel to the central axis of the processed rod-like body W(B). The processed rod-like body W(B) is then guided by the inclination of the guide chute 16 and transferred downstream with orientation of the central axis of the processed rod-like body W(B) basically unchanged.

As shown in FIG. 2, the production apparatus 11 includes a control unit 85 which is electrically connected to the gripping drive unit 26, the rotation drive unit 27, the transfer drive unit 28, the withdrawing drive unit 53, the discharge drive unit 72, the work detection sensor 61, the unit detection sensor 81, and other such things to control the same.

The following description will explain a method for producing a rod-like body using the production apparatus 11.

When the processing of the processed rod-like body W(B) by the processing unit 12 is finished, the control unit 85 causes the transfer drive unit 28 to stop the movable unit 75 at the discharge position. At the same time as stopping the movable unit 75, the control unit 85 drives the gripping drive unit 26 of the processing unit main body 23 to move the sleeve 34 to the rear side. The chuck main body 32 is increased in diameter due to springback to release the grip on the processed rod-like body W(B).

In a state where the work detection sensor 61 does not detect the processed rod-like body W(B), the control unit 85 causes the withdrawing drive unit 53 to operate the belt conveyer 52 of the withdrawing unit 14 in a direction of withdrawing the processed rod-like body W(B). In states other than a state where the work detection sensor 61 detects the processed rod-like body W(B), and the unit detection sensor 81 detects the detection piece 82 of the movable unit 75, the discharge switching member 71 is in the restriction state discussed above.

Before the unprocessed rod-like body W(A) is processed by the processing unit 12, the control unit 85 first conducts a preprocessing transfer step which positions the unprocessed rod-like body W(A) in a predetermined receiving position which is previously set in the processing unit 12. The receiving position in the processing unit 12, in which the unprocessed rod-like body W(A) is placed, is a position where the unprocessed rod-like body W(A) is inserted into the chuck main body 32 of the processing unit main body 23 by predetermined length.

The specification will explains a case in which the unprocessed rod-like body W(A) is transferred by the feeding unit, not shown, and placed in the predetermined receiving position which is previously set in the processing unit main body 23 of the movable unit 75 which stops at the discharge position in the preprocessing transfer step.

In the preprocessing transfer step, the control unit 85 causes the feeding unit, not shown, to transfer the unprocessed rod-like body W(A) which has gone through the preceding process from the front side to the rear side of the processing unit main body 23 along the axis of the unprocessed rod-like body W(A). The unprocessed rod-like body W(A) is thus inserted into the chuck main body 32 by the predetermined length and placed in the receiving position. If the unprocessed rod-like body W(A) is placed in the receiving position in the processing unit 12 in the foregoing manner, the unprocessed rod-like body W(A) is inserted into the through-hole 31 of the chuck main body 32 from the front side as shown in FIGS. 3 to 1.

At this time, if there is the processed rod-like body W(B) in the chuck main body 32, which has already been processed, the processed rod-like body W(B) is pushed by the unprocessed rod-like body W(A) which has been inserted. The processed rod-like body W(B) then moves to the rear side along the axis thereof and is pushed out of the chuck main body 32 to the rear side to be inserted into the rail portion 13. That is, a post-processing transfer step is performed, which pushes the processed rod-like body W(B) located in the chuck main body 32 with the unprocessed rod-like body W(A) by the preprocessing transfer step for the unprocessed rod-like body W(A), and thus transfers the processed rod-like body W(B) in one direction along the axis thereof to the rail portion 13 which is provided integrally with the processing unit main body 23.

At this time, if there is the processed rod-like body W(B) is also in the rail portion 13, the processed rod-like body W(B) pushed out of the chuck main body 32 pushes the processed rod-like body W(B) which is already in the rail portion 13, to transfer the processed rod-like body W(B) along the axis thereof to the withdrawing unit 14 side. In other words, the rail portion transfer step is performed, which pushes the processed rod-like body W(B) located in the chuck main body 32 with the unprocessed rod-like body W(A) by the preprocessing transfer step for the unprocessed rod-like body W(A), pushes the processed rod-like body W(B) located within the rail portion 13 by the above-mentioned processed rod-like body W(B), and transfers the processed rod-like body W(B) located within the rail portion 13 along the axis thereof to the withdrawing unit 14 while being guided by the rail portion 13.

At this time, if the rail portion 13 is full of processed rod-like bodies W(B) in line, the processed rod-like body W(B) pushed out of the chuck main body 32 pushes the processed rod-like bodies W(B) filling the rail portion 13 in a line, and thus causes the processed rod-like body W(B) located closest to the withdrawing unit 14 within the rail portion 13 to partially project from the rail portion 13 to the withdrawing unit 14 side as shown in FIG. 7. That is, the processed rod-like body W(B) located closest to the withdrawing unit 14 within the rail portion 13 is made to project from the rail portion 13 to the withdrawing unit 14 side by the preprocessing transfer step for the unprocessed rod-like body W(A). The projecting processed rod-like body W(B) comes into contact with the upper face of the endless belt 55 of the belt conveyer 52 of the withdrawing unit 14 which is in a driven state. Due to friction, the processed rod-like body W(B) is transferred integrally with the upper face to be detached from the rail portion 13, and then, the whole processed rod-like body W(B) is placed on the upper face of the endless belt 55. In short, the withdrawing step is performed, which withdraws the processed rod-like body W(B) from the rail portion 13 along the axis of the processed rod-like body W(B) by using the withdrawing unit 14 provided integrally with the rail portion 13 to be located on the opposite side to the processing unit 12.

The processed rod-like body W(B) which has been withdrawn from the rail portion 13 and placed on the upper face of the endless belt 55 of the belt conveyer 52 moves along the axis of the processed rod-like body W(B) in the direction away from the rail portion 13 integrally with the upper face of the endless belt 55. When the processed rod-like body W(B) is detected by the work detection sensor 61, the control unit 85 causes the withdrawing drive unit 53 to stop the belt conveyer 52. In brief, the detection step is performed, which detects, by using the work detection sensor 61, that the processed rod-like body W(B) is transferred from the rail portion 13 to the withdrawing unit 14. At this time, the discharge unit 15 is in the restriction state, and the axial movement of the processed rod-like body W(B) carried by the belt conveyer 52 is guided by the discharge switching member 71 located on a lower side of inclination of the belt conveyer 52.

After the unprocessed rod-like body W(A) is placed in the receiving position in the processing unit 12 in the preprocessing transfer step, the control unit 85 drives the gripping drive unit 26 of the processing unit main body 23 to move the sleeve 34 to the front side. As a result, the unprocessed rod-like body W(A) is gripped by the processing unit main body 23 at the receiving position in the processing unit 12. After the gripping is done, the control unit 85 causes the rotation drive unit 27 to rotate the rotary head 21, causes the transfer drive unit 28 to transfer the movable unit 75 including the processing unit main body 23, the rail portion 13, the withdrawing unit 14, and the discharge unit 15 of the processing unit 12, to thereby transfer the unprocessed rod-like body W(A) relative to the machining tool 24 along the preset locus. The machining tool 24 comes into contact with the protruding portion of the unprocessed rod-like body W(A) in rotation, which protrudes from the rotary head 21, causing the machining tool 24 to move relative to the protruding portion of the unprocessed rod-like body W(A). The machining tool 24 machines the protruding portion into a predetermined shape to form the processed rod-like body W(B). In short, the processing step is performed, which processes the unprocessed rod-like body W(A) into the processed rod-like body W(B) by using the processing unit 12.

When moving in the processing step as described, the movable unit 75 is deviated from the discharge position, which makes the unit detection sensor 81 fail to detect the detection piece 82. Even if the post-processing transfer step, the rail portion transfer step, and the withdrawing step are performed simultaneously with the preprocessing transfer step because the processing step is performed immediately after the preprocessing transfer step, the movable unit 75 is deviated from the discharge position by the time of execution of the detection step as it takes time between start of the withdrawing step and the execution of the detection step, resulting in failure of detection by the unit detection sensor 81.

After the processing step is finished, the control unit 85 causes the transfer drive unit 28 to stop the movable unit 75 at the discharge position. This enables the unit detection sensor 81 to detect the detection piece 82. If the processed rod-like body W(B) located in the withdrawing unit 14 is detected by the work detection sensor 61 as described above, the work detection sensor 61 detects the processed rod-like body W(B), and at the same time, the unit detection sensor 81 detects the detection piece 82 of the movable unit 75. The control unit 85 therefore causes the discharge drive unit 72 to lift the discharge switching member 71 to bring the discharge switching member 71 into the allowing state. This produces a gap between the discharge switching member 71 and the belt conveyer 52. Due to the inclination of the belt conveyer 52, the processed rod-like body W(B) rolls on the belt conveyer 52 in the direction perpendicular to the axis to be dropped from the belt conveyer 52. That is, the discharge step is performed, which discharges the processed rod-like body W(B), which is detected in the detection step to have been transferred from the rail portion 13 to the withdrawing unit 14, from the withdrawing unit 14 in the direction perpendicular to the axis of the processed rod-like body W(B). The discharge step is performed after the movable unit 75 including the processing unit main body 23, the rail portion 13, the withdrawing unit 14, and the discharge unit 15 of the processing unit 12 is placed in the predetermined discharge position.

When the processed rod-like body W(B) is dropped from the belt conveyer 52 of the movable unit 75 located in the discharge position, the processed rod-like body W(B) is dropped onto an upper part of the inclined guide chute 16, which is closer to the processed rod-like body W(B) than a lower part of the inclined guide chute 16 in respect of distance in height as shown in FIG. 9. The processed rod-like body W(B) is then guided by the inclination of the guide chute 16 to move downstream in a transfer direction with orientation of the central axis of the processed rod-like body W(B) basically unchanged.

After the discharge switching member 71 is lifted by the discharge drive unit 72 to come into the allowing state, the processed rod-like body W(13) is discharged from the withdrawing unit 14, which forms the state where the processed rod-like body W(B) is not detected by the work detection sensor 61. The control unit 85 then comes into a state that allows the transfer drive unit 28 to move the movable unit 75 from the discharge position. This allows the processing of the subsequent unprocessed rod-like body W(A). At the same time, the control unit 85 causes the discharge drive unit 72 to lower the discharge switching member 71 to put the discharge unit 15 into the restriction state. The control unit 85 further causes the withdrawing drive unit 53 to rotate the belt conveyer 52 of the withdrawing unit 14 in the direction withdrawing the processed rod-like body W(B) from the rail main body 41.

The following description will explain a case in which the unprocessed rod-like body W(A) is collected by the movable unit 75 and placed in the predetermined receiving position which is previously set in the processing unit main body 23 of the movable unit 75 in the preprocessing transfer step.

In the preprocessing transfer step, the control unit 85 causes the transfer drive unit 28 to move the movable unit 75 located in the discharge position and thus makes the movable unit 75 collect the unprocessed rod-like body W(A) standing by at the predetermined position. More specifically, the control unit 85 moves the processing unit main body 23 to the front side along the axis of the unprocessed rod-like body W(A), and makes the unprocessed rod-like body W(A) enter the chuck main body 32 by the predetermined length to position the unprocessed rod-like body W(A) in the receiving position. Since it is possible to move either the processing unit main body 23 or the unprocessed rod-like body W(A), the preprocessing transfer step transfers the unprocessed rod-like body W(A) relative to the processing unit main body 23 of the processing unit 12 in one direction along the axis of the unprocessed rod-like body W(A) to position the unprocessed rod-like body W(A) in the receiving position in the processing unit 12.

Similarly to the case discussed above, the processed rod-like body W(B) located in the chuck main body 32 is inserted into the rail portion 13 by being pushed out of the chuck main body 32 by the unprocessed rod-like body W(A) inserted into the chuck main body 32. To be short, the post-processing transfer step is performed. Similarly to the foregoing case, the processed rod-like body W(B) pushed out of the chuck main body 32 pushes the processed rod-like body W(B) located within the rail portion 13 to move the processed rod-like body W(B) to the withdrawing unit 14 side along the axis of the processed rod-like body W(B). In brief, the rail portion transfer step is performed. Again, similarly to the above case, the processed rod-like body W(B) pushed out of the chuck main body 32 pushes the processed rod-like bodies W(B) filling the rail portion 13 in a line. The processed rod-like body W(B) located closest to the withdrawing unit 14 within the rail portion 13 then projects from the rail portion 13 to the withdrawing unit 14 side. The projecting processed rod-like body W(B) is withdrawn from the rail portion 13 by the belt conveyer 52 of the withdrawing unit 14. In brief, the withdrawing step is performed. Similarly to the case discussed above, the processed rod-like body W(B) withdrawn from the rail portion 13 is transferred by the belt conveyer 52 and detected by the work detection sensor 61. In brief, the detection step is performed. The control unit 85 then stops the belt conveyer 52.

In the present case, like the one described above, after the unprocessed rod-like body W(A) is placed in the receiving position in the processing unit 12 in the preprocessing transfer step, the control unit 85 causes the processing unit main body 23 to grip the unprocessed rod-like body W(A). After the gripping is done, the control unit 85 moves the movable unit 75 to transfer the unprocessed rod-like body W(A) relative to the machining tool 24 along the preset locus, to thereby machine the unprocessed rod-like body W(A) to make the processed rod-like body W(B). The processing step is thus performed.

During a time period between the preprocessing transfer step and the processing step, the movable unit 75 is not placed in the discharge position, and the detection piece 82 is not detected by the unit detection sensor 81. Accordingly, even if the post-processing transfer step, the rail portion transfer step, and the withdrawing step are performed at the same time as the preprocessing transfer step, the movable unit 75 is deviated from the discharge position by the time of execution of the detection step, resulting in failure of detection by the unit detection sensor 81.

After the processing step is finished, the control unit 85 causes the transfer drive unit 28 to stop the movable unit 75 at the discharge position. This enables the unit detection sensor 81 to detect the detection piece 82. At this time, if the processed rod-like body W(B) located in the withdrawing unit 14 is detected by the work detection sensor 61, the work detection sensor 61 detects the processed rod-like body W(B), and at the same time, the unit detection sensor 81 detects the detection piece 82 of the movable unit 75. The control unit 85 therefore puts the discharge unit 15 into the allowing state. This produces the gap between the discharge switching member 71 and the belt conveyer 52. Due to the inclination of the belt conveyer 52, the processed rod-like body W(3) rolls on the belt conveyer 52 in the direction perpendicular to the axis to be dropped from the belt conveyer 52. In short, the discharge step is performed. When the processed rod-like body W(B) is dropped from the belt conveyer 52 of the movable unit 75 located in the discharge position, the processed rod-like body W(B) is dropped onto the upper part of the inclined guide chute 16, which is closer to the processed rod-like body W(B) than a lower part of the inclined guide chute 16 in respect of distance in height. The processed rod-like body W(B) is then guided by the inclination of the guide chute 16 to move downstream in a transfer direction with orientation of the central axis of the processed rod-like body W(B) basically unchanged.

In the present case, like the one described above, the processed rod-like body W(B) is discharged from the withdrawing unit 14 after the discharge unit 15 is put into the allowing state, which forms the state where the processed rod-like body W(B) is not detected by the work detection sensor 61. The control unit 85 comes into a state that allows the movable unit 75 to move from the discharge position. This allows the processing of the subsequent unprocessed rod-like body W(A). At the same time, the control unit 85 puts the discharge unit 15 into the restriction state, and the withdrawing unit 14 into the driven state.

According to the Patent Literature 1, a pipe that has been cut off is dropped onto a discharge chute to be rolled and transferred using inclination of the discharge chute. The discharge chute is designed to be moveable in order to receive the pipe at a proper position. However, to move the discharge chute incurs cost increase.

In contrast, according to the production apparatus 11 of the embodiment, when the unprocessed rod-like body W(A) is transferred in one direction along the axis of the unprocessed rod-like body W(A) so as to move relative to the processing unit 12 which processes the unprocessed rod-like body W(A) which has been fed into the processed rod-like body W(B), and is fed to the receiving position, the processed rod-like body W(B) which has already been processed is pushed by the unprocessed rod-like body W(A) which is being fed, to be transferred in one direction along the axis of the processed rod-like body W(B) in the processing unit 12. The processed rod-like body W(B) which has been processed is guided by the rail portion 13 provided integrally with the processing unit to be transferred in one direction along the axis of the processed rod-like body W(B). At this time, if the rail portion 13 is filled with the processed rod-like bodies W(B), the processed rod-like body W(B) located farthest to the processing unit 12 projects from the rail portion 13. The projecting processed rod-like body W(B) is withdrawn along the axis thereof by the withdrawing unit 14 provided integrally with the rail portion 13 to be located on the opposite side to the processing unit 12. When the work detection sensor 61 detects that the processed rod-like body W(B) is transferred from the rail portion 13 to the withdrawing unit 14, the discharge unit 15 discharges the processed rod-like body W(B) from the withdrawing unit 14 in the direction perpendicular to the axis of the processed rod-like body W(B).

In other words, the production apparatus 11 performs the preprocessing transfer step which transfers the unprocessed rod-like body W(A) relative to the processing unit 12 in one direction along the axis of the unprocessed rod-like body W(A) and places the unprocessed rod-like body W(B) in the receiving position in the processing unit 12; the post-processing transfer step which pushes the processed rod-like body W(B) with the unprocessed rod-like body W(A), and thus transfers the processed rod-like body W(B) in one direction along the axis of the processed rod-like body W(B) to the rail portion 13 which is provided integrally with the processing unit 12; the rail portion transfer step which pushes the processed rod-like body W(B) with the unprocessed rod-like body W(A) by the preprocessing transfer step for the unprocessed rod-like body W(A), and thus transfers the processed rod-like body W(B) in one direction along the axis of the processed rod-like body W(B) while being guided by the rail portion 13; the withdrawing step which withdraws the processed rod-like body W(B) from the rail portion 13 along the axis of the processed rod-like body W(B) using the withdrawing unit 14 which is provided integrally with the rail portion 13 to be located on the opposite side to the processing unit 12; the detection step which detects that the processed rod-like body W(B) is transferred from the rail portion 13 to the withdrawing unit 14; and the discharge step which discharges the processed rod-like body W(B), which is detected in the detection step to have been transferred from the rail portion 13 to the withdrawing unit 14, from the withdrawing unit 14 in the direction perpendicular to the axis of the processed rod-like body W(B).

When the processing unit 12 is moved, the rail portion 13 provided integrally with the processing unit 12 and the withdrawing unit 14 provided integrally with the rail portion 13 move in an integral manner. The position at which the withdrawing unit 14 discharges the processed rod-like body W(B) therefore can be moved by using a transfer mechanism of the processing unit 12. The processed rod-like body W(B) therefore can be favorably discharged with a limited cost increase.

Since the discharge position at which the withdrawing unit 14 discharges the processed rod-like body W(B) is set directly above the upper part of the inclined guide chute 16, a dropping distance of the processed rod-like body W(B) is decreased. This reduces an impact caused when the dropped processed rod-like body W(B) hits the guide chute 16, and therefore lessens a possibility for a dent or the like to be made. It is also possible to stabilize a posture of the processed rod-like body W(B) at a moment when the dropped processed rod-like body W(B) hits the guide chute 16. The processed rod-like body W(B) therefore can be favorably rolled and transferred in a radial direction.

Furthermore, since the processed rod-like body W(B) is discharged from the withdrawing unit 14 in the direction perpendicular to the axis of the processed rod-like body W(B), even when processing the rod-like bodies W varied in length, the embodiment of the invention is capable of favorably rolling and transferring the processed rod-like bodies W(B) in the radial direction. More specifically, if the processed rod-like body W(B) is transferred and discharged in the axial direction, variation of length of the processed rod-like body W(B) makes inconstant an angle at which the processed rod-like body W(B) hits the guide chute 16. This makes unstable the posture of the processed rod-like body W(B) after the processed rod-like body W(B) hits the guide chute 16. However, the embodiment of the invention lessens a possibility that the dropping posture of the processed rod-like body W(B) becomes unstable because of variation of length of the processed rod-like body W(B).

Since the processing unit 12, the rail portion 13, and the withdrawing unit 14 are moved in the processing step, the position at which the processed rod-like body W(B) is discharged from the withdrawing unit 14 can be moved by using the transfer mechanism provided to perform the processing step. It is therefore possible to favorably discharge the processed rod-like body W(B) with a limited cost increase.

The discharge unit 15 discharges the processed rod-like body W(B) from the withdrawing unit 14 when the processing unit 12, the rail portion 13, and the withdrawing unit 14 are placed in the predetermined discharge position. That is, the discharge step is performed when the processing unit 12, the rail portion 13, and the withdrawing unit 14 are placed in the predetermined discharge position. The processed rod-like body W(B) therefore can be more favorably discharged.

Processing units that can be utilized here, besides lathes, include various processing units as long as the units process rod-like bodies and are movable. For example, the processing unit may be a high-frequency hardening unit configured to apply high-frequency hardening to rod-like bodies. As for the rail portion, any rail portions can be utilized even if the rail portions are not cylindrical pipes as long as they are capable of axially transferring rod-like bodies while controlling movement of the rod-like bodies in a direction perpendicular to axes of the rod-like bodies. For example, utilizable rail portions include those configured to support rod-like bodies with two parallel shafts from below, those having a shape of a half cylinder which is opened upward, those with lateral edges provided with walls vertically arranged, and other rail portions.

The embodiment discussed above includes the preprocessing transfer step which transfers the unprocessed rod-like body relative to the processing unit in one direction along the axis of the unprocessed rod-like body and places the unprocessed rod-like body in the receiving position in the processing unit; the processing step which processes the unprocessed rod-like body into the processed rod-like body by using the processing unit; the post-processing transfer step which pushes the processed rod-like body with the unprocessed rod-like body by the preprocessing transfer step for the unprocessed rod-like body and thus transfers the processed rod-like body in one direction along the axis of the processed rod-like body to the rail portion which is provided integrally with the processing unit, the rail portion transfer step which pushes the processed rod-like body with the unprocessed rod-like body by the preprocessing transfer step for the unprocessed rod-like body, and thus transfers the processed rod-like body in one direction along the axis of the processed rod-like body while being guided by the rail portion; the withdrawing step which withdraws the processed rod-like body from the rail portion along the axis of the processed rod-like body using the withdrawing unit which is provided integrally with the rail portion to be located on the opposite side to the processing unit; the detection step which detects that the processed rod-like body is transferred from the rail portion to the withdrawing unit; and the discharge step which discharges the processed rod-like body, which is detected in the detection step to have been transferred from the rail portion to the withdrawing unit, from the withdrawing unit in the direction perpendicular to the axis of the processed rod-like body. The processed rod-like body therefore can be favorably discharged with a limited cost increase.

The processing unit, the rail portion, and the withdrawing unit are moved in the processing step, so that the position at which the processed rod-like body is discharged from the withdrawing unit can be moved by using the transfer mechanism provided to perform the processing step. The processed rod-like body therefore can be favorably discharged with a limited cost increase.

The discharge step is performed when the processing unit, the rail portion, and the withdrawing unit are placed in predetermined positions, so that the processed rod-like body can be more favorably discharged.

The embodiment of invention includes the processing unit configured to be fed with the unprocessed rod-like body which is transferred relative to the processing unit in one direction along the axis of the unprocessed rod-like body, and process the unprocessed rod-like body which has been fed to make the processed rod-like body, the processing unit in which the processed rod-like body which has already been processed is pushed by the unprocessed rod-like body which is being fed, to be transferred in one direction along the axis of the processed rod-like body; the rail portion provided integrally with the processing unit and configured to guide the processed rod-like body pushed and moved by the unprocessed rod-like body which is being fed to the processing unit, in one direction along the axis of the processed rod-like body; the withdrawing unit provided integrally with the rail portion to be located on the opposite side to the processing unit, and configured to withdraw the processed rod-like body from the rail portion along the axis of the processed rod-like body; the detection sensor configured to detect that the processed rod-like body has been transferred from the rail portion to the withdrawing unit; and the discharge unit configured to discharge the processed rod-like body that has been detected by the detection sensor to have been transferred to the withdrawing unit, from the withdrawing unit in the direction perpendicular to the axis of the processed rod-like body. The embodiment of the invention further includes the processing unit configured to process the rod-like body; the rail portion configured to guide the plurality of rod-like bodies transferred in the axial direction by being pushed by the rod-like body discharged from the processing unit; the withdrawing unit provided to the rail portion to be located on the opposite side to the processing unit and configured to withdraw the rod-like body from the rail portion; and the discharge unit configured to discharge the rod-like body from the withdrawing unit in the direction perpendicular to the axis of the rod-like body. The processed rod-like body therefore can be favorably discharged with a limited cost increase.

The discharge unit discharges the processed rod-like body from the withdrawing unit when the processing unit, the rail portion, and the withdrawing unit are placed in the predetermined positions. The withdrawing unit is provided with the detection sensor configured to detect the position of the rod-like body. Upon detection of a signal of the detection sensor, the discharge unit discharges the rod-like body. This allows the processed rod-like body to be more favorably discharged.

A first embodiment of the method for producing a rod-like body comprises the preprocessing transfer step which transfers an unprocessed rod-like body relative to the processing unit in one direction along an axis of the unprocessed rod-like body and places the unprocessed rod-like body in the receiving position in the processing unit; the processing step which processes an unprocessed rod-like body into a processed rod-like body by using the processing unit; the post-processing transfer step which pushes a processed rod-like body with the unprocessed rod-like body by the preprocessing transfer step for an unprocessed rod-like body and thus transfers the processed rod-like body in one direction along an axis of the processed rod-like body to the rail portion which is provided integrally with the processing unit; the rail portion transfer step which pushes a processed rod-like body with the unprocessed rod-like body by the preprocessing transfer step for an unprocessed rod-like body, and thus transfers the processed rod-like body in one direction along an axis of the processed rod-like body while being guided by the rail portion; the withdrawing step which withdraws a processed rod-like body from the rail portion along an axis of the processed rod-like body using the withdrawing unit which is provided integrally with the rail portion to be located on the opposite side to the processing unit; the detection step which detects that a processed rod-like body is transferred from the rail portion to the withdrawing unit; and the discharge step which discharges a processed rod-like body, which is detected in the detection step to have been transferred from the rail portion to the withdrawing unit, from the withdrawing unit in the direction perpendicular to an axis of the processed rod-like body.

In a second embodiment of the method for producing a rod-like body according to the first embodiment, the processing unit, the rail portion, and the withdrawing unit are moved in the processing step.

In a third embodiment of the method for producing a rod-like body according to the second embodiment, the discharge step is performed when the processing unit, the rail portion, and the withdrawing unit are placed in the predetermined positions.

In a fourth embodiment of the apparatus for producing a rod-like body comprises the processing unit configured to process a rod-like body; the rail portion configured to guide a plurality of rod-like bodies transferred in the axial direction by being pushed by a rod-like body discharged from the processing unit; the withdrawing unit provided to the rail portion to be located on the opposite side to the processing unit and configured to withdraw the rod-like body from the rail portion; and the discharge unit configured to discharge the rod-like body from the withdrawing unit in the direction perpendicular to the axis of the rod-like body.

In a fifth embodiment of the apparatus for producing a rod-like body according to the fourth embodiment, the withdrawing unit is provided with the detection sensor configured to detect the position of the rod-like body. Upon detection of the signal of the detection sensor, the discharge unit discharges the rod-like body.

Although the embodiments of the invention have been described, one skilled in the art should easily understand that the exemplary embodiments may be modified or improved in various ways without materially departing from the novel teachings and advantages of the invention. Accordingly, all such modifications and improvement are intended to be included within the technical scope of the invention. The embodiments may be combined in any ways.

The embodiments of the invention are presented to facilitate understanding of the invention and do not limit the invention. The invention may be modified or improved without deviating from the gist thereof. Needless to say, the invention includes equivalents thereof. The constituent elements mentioned in the claims and description may be combined in any ways or omitted within a scope where the problem can be at least partially solved or a scope where the advantages are at least partially provided.

The present application claims priority under Japanese Patent Application No. 2015-152720 filed on Jul. 31, 2015. The entire disclosure of Japanese Patent Application No. 2015-152720 filed on Jul. 31, 2015, including the description, claims, drawings and abstract, is incorporated herein by reference in its entirety.

The entire disclosure of Japanese Unexamined Patent Application Publication (Kokai) No. S61-260901 (Patent Literature 1), including the description, claims, drawings and abstract, is incorporated herein by reference in its entirety.

REFERENCE SIGNS LIST

11 Production apparatus
12 Processing unit
13 Rail portion
14 Withdrawing unit
15 Discharge unit
61 Work detection sensor (Detection sensor)
W Rod-like body
W(A) Unprocessed rod-like body
W(B) Processed rod-like body

The invention claimed is:

1. A method for producing a rod-like body, comprising:
a preprocessing transfer step which transfers an unprocessed rod-like body relative to a processing unit in one direction along an axis of the unprocessed rod-like body and places the unprocessed rod-like body in a receiving position in the processing unit;
a processing step which processes an unprocessed rod-like body into a processed rod-like body by using the processing unit;
a post-processing transfer step which pushes a processed rod-like body with the unprocessed rod-like body by the preprocessing transfer step for an unprocessed rod-like body and thus transfers the processed rod-like body in one direction along an axis of the processed rod-like body to a rail portion which is provided integrally with the processing unit;
a rail portion transfer step which pushes a processed rod-like body with an unprocessed rod-like body by the preprocessing transfer step for an unprocessed rod-like body, and thus transfers the processed rod-like body in one direction along an axis of the processed rod-like body while being guided by the rail portion;
a withdrawing step which withdraws a processed rod-like body from the rail portion along an axis of the processed rod-like body using a withdrawing unit which is provided integrally with the rail portion to be located on an opposite side to the processing unit;
a detection step which detects that a processed rod-like body is transferred from the rail portion to the withdrawing unit; and
a discharge step which discharges a processed rod-like body, which is detected in the detection step to have been transferred from the rail portion to the withdrawing unit, from the withdrawing unit in a direction perpendicular to an axis of the processed rod-like body.

2. The method for producing a rod-like body according to claim 1, wherein the processing unit, the rail portion, and the withdrawing unit are moved in the processing step.

3. The method for producing a rod-like body according to claim 2, wherein the discharge step is performed when the processing unit, the rail portion, and the withdrawing unit are placed in predetermined positions.

4. An apparatus for producing a rod-like body, comprising:
a processing unit configured to process a rod-like body;
a rail portion configured to guide a plurality of rod-like bodies transferred in an axial direction by being pushed by a rod-like body discharged from the processing unit;
a withdrawing unit provided to the rail portion to be located on an opposite side to the processing unit and configured to withdraw the rod-like body from the rail portion; and
a discharge unit configured to discharge the rod-like body from the withdrawing unit in a direction perpendicular to an axis of the rod-like body.

5. The apparatus for producing a rod-like body according to claim 4, wherein
the withdrawing unit is provided with a detection sensor configured to detect a position of the rod-like body; and
upon detection of a signal of the detection sensor, the discharge unit discharges the rod-like body.

* * * * *